United States Patent (10) Patent No.: US 10,051,513 B2
Won et al. (45) Date of Patent: Aug. 14, 2018

(54) METHOD AND APPARATUS FOR
OBTAINING AUTHENTICATION
INFORMATION

(71) Applicant: Samsung Electronics Co., Ltd.,
Suwon-si, Gyeonggi-do (KR)

(72) Inventors: Sung Hwan Won, Suwon-si (KR);
Songyean Cho, Seoul (KR); Jinuk Lee,
Suwon-si (KR)

(73) Assignee: Samsung Electronics Co., Ltd.,
Suwon-si (KR)

( * ) Notice: Subject to any disclaimer, the term of this
patent is extended or adjusted under 35
U.S.C. 154(b) by 0 days.

(21) Appl. No.: 14/909,844

(22) PCT Filed: Aug. 8, 2014

(86) PCT No.: PCT/KR2014/007400
§ 371 (c)(1),
(2) Date: Mar. 23, 2016

(87) PCT Pub. No.: WO2015/020488
PCT Pub. Date: Feb. 12, 2015

(65) Prior Publication Data
US 2016/0249249 A1 Aug. 25, 2016

(30) Foreign Application Priority Data

Aug. 8, 2013 (KR) .................. 10-2013-0094176
Sep. 16, 2013 (KR) .................. 10-2013-0111193
Oct. 10, 2013 (KR) .................. 10-2013-0120826

(51) Int. Cl.
H04W 28/02 (2009.01)
H04W 12/06 (2009.01)
(Continued)

(52) U.S. Cl.
CPC ......... *H04W 28/0289* (2013.01); *H04W 8/06*
(2013.01); *H04W 12/06* (2013.01); *H04W*
*36/0022* (2013.01)

(58) Field of Classification Search
CPC ............. H04W 12/06; H04W 28/0289; H04W
36/0022
See application file for complete search history.

(56) References Cited

U.S. PATENT DOCUMENTS

2012/0213140 A1   8/2012   Olsson et al.
2012/0263298 A1   10/2012  Suh et al.
(Continued)

FOREIGN PATENT DOCUMENTS

EP   2 159 972 A1      3/2010
EP   2159972 A1 *      3/2010   .............. H04W 8/26
(Continued)

OTHER PUBLICATIONS

'MME Behavior in Responding to S1 UE Context Release Request
due to User Inactivity', S2-130919, 3GPP TSG SA WG2 Meeting
96, Apr. 12, 2013.
(Continued)

Primary Examiner — Gbemileke J Onamuti
(74) Attorney, Agent, or Firm — Jefferson IP Law, LLP

(57) ABSTRACT

An embodiment of the present invention relates to a method
and an apparatus for collecting authentication information of
a terminal while reducing the load of a home subscriber
server (HSS). The present invention provides a method and
an apparatus for transmitting a location registration message
of a terminal for convenience of the mobility management
node selection by a base station, a method and an apparatus
for the mobility management node selection by a base
station, and a method and an apparatus for collecting authen-
tication information by the mobility management node.

(Continued)

According to the embodiment of the present invention, it is possible to obtain authentication information of the terminal while reducing the load of the HSS.

20 Claims, 13 Drawing Sheets

(51) Int. Cl.
    *H04W 8/06*         (2009.01)
    *H04W 36/00*      (2009.01)

(56) References Cited

U.S. PATENT DOCUMENTS

| | | | |
|---|---|---|---|
| 2012/0269117 A1* | 10/2012 | Hu | H04L 45/04 370/328 |
| 2013/0079006 A1 | 3/2013 | Cho et al. | |
| 2013/0114567 A1 | 5/2013 | Bojeryd | |
| 2013/0155948 A1* | 6/2013 | Pinheiro | H04W 4/005 370/328 |

FOREIGN PATENT DOCUMENTS

| | | | | |
|---|---|---|---|---|
| EP | 2 288 185 A1 | | 2/2011 | |
| EP | 2288185 A1 | * | 2/2011 | ............ H04W 8/06 |
| EP | 2590456 A1 | | 5/2013 | |
| KR | 10-2011-0137652 A | | 12/2011 | |

OTHER PUBLICATIONS

"GPRS Enhancements for E-UTRAN Access", ETSI TS 123.401, version 11.6.0, Jun. 24, 2013.

3rd Generation Partnership Project; "Technical Specification Group Services and System Aspects; General Packet Radio Service (GPRS) enhancements for Evolved Universal Terrestrial Radio Access Network (E-UTRAN) access (Release 9)"; Jul. 23, 2013, pp. 1-256, 3GPP TS 23.401 V9.15.0, XP050725729, 650 Route des Lucioles—Sophia Antipolis Valbonne—France.

Dan Forsberg et al., "LTE Security", Jan. 1, 2010, XP055286159, US, ISBN: 978-0-470-66103-1, Retrieved from the Internet: URL: http://samples.sainsburysebooks.co.uk/9780470973288_sample_367593.pdf [retrieved on Jul. 6, 2016].

* cited by examiner

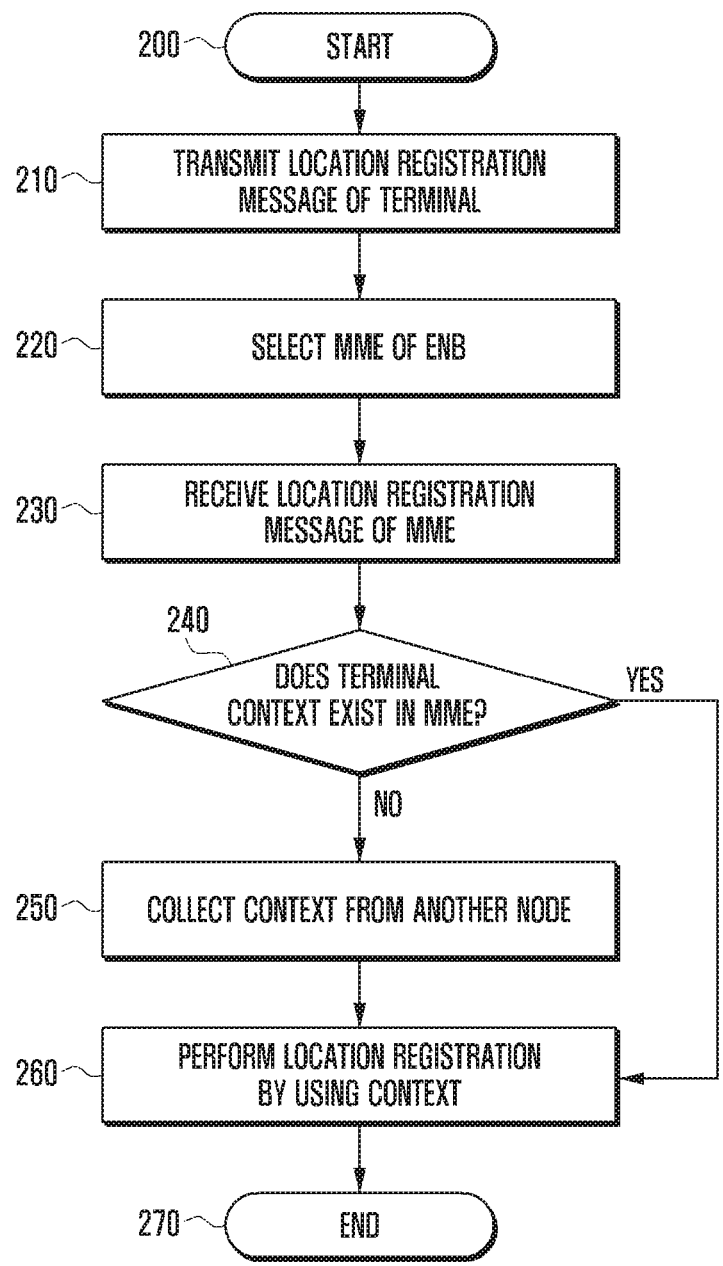

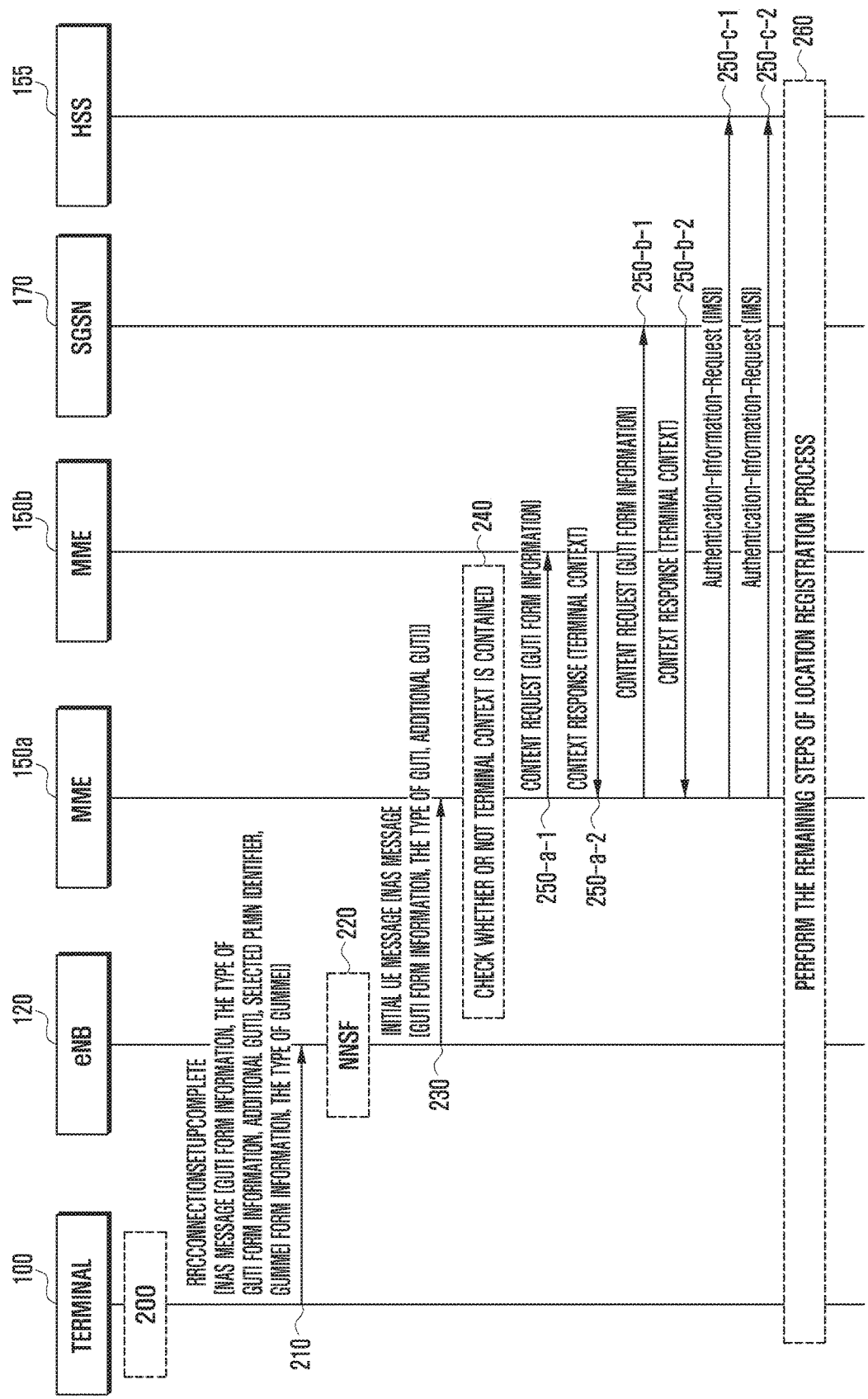

METHOD AND APPARATUS FOR OBTAINING AUTHENTICATION INFORMATION

TECHNICAL FIELD

The present invention relates to a method and an apparatus for obtaining authentication information (including authentication vectors). More particularly, the present invention relates to a method and an apparatus for obtaining the authentication information (the authentication vectors) while reducing requests that are transmitted to the authentication center as much as possible in order to reduce the overload of the authentication center.

BACKGROUND ART

Initial wireless communication systems have been developed to provide voice services while allowing the user to be mobile. Furthermore, the wireless communication systems have gradually provided data services as well as voice services, and recently, have advanced to provide a high-speed data service.

FIG. 1 illustrates a typical wireless communication system. Referring to FIG. 1, the wireless communication system may include a terminal 100, radio access networks (RAN) 125, 135, and 145, and core networks.

The radio access networks (RAN) 125, 135, and 145 have gradually changed over time. The terminal 100 has accessed radio access networks referred to as a GERAN (GSM EDGE radio access network) 145 and a UTRAN (Universal Terrestrial radio access network) 135 through a Um interface 118 and a Uu interface 114, respectively in the second and third generation communication systems. Currently, the terminal 100 may access a radio access network named E-UTRAN (Evolved-Universal Terrestrial radio access network) 125 through an LTE (Long Term Evolution)-Uu interface 110. The E-UTRAN 125 is generally referred to as LTE as well.

The E-UTRAN 125, the UTRAN 135, and the GERAN 145 are the networks comprised of a plurality of evolved nodes B (eNB) 120, a radio network subsystem (RNS) 130, and a base station subsystem (BSS) 140. For example, the E-UTRAN is a complicated network in which a plurality of evolved nodes B (eNB) 120 are connected. Each of the evolved Node B (eNB) 120, the radio network subsystem (RNS) 130, and the base station subsystem (BSS) 140 provides services to the terminal 100 in a specific range that is referred to as coverage. Since the coverage is limited, the terminal 100 should connect wirelessly to at least one of the evolved node B (eNB) 120, the radio network subsystem (RNS) 130, or the base station subsystem (BSS) 140 in order to use voice and/or data services while moving.

The radio network subsystem (RNS) 130 among the elements 120, 130, and 140 of the RANs (radio access networks) may be further divided into a node B (NB) and an RNC (Radio Network Controller). The base station subsystem (BSS) 140 may be further divided into a base transceiver station (BTS) and a base station controller (BSC). The node B (NB) and the base transceiver station (BTS) may be connected with the terminal 100 through wireless interfaces 114 and 118, and the radio network controller (RNC) and the base station controller (BSC) may be connected with the core network (CN) 180. The evolved node B (eNB) 120 may perform two functions. That is, one function is connecting to the terminal 100 through the wireless interface 110, and the other function is connecting to the evolved packet core (EPC) 160, which is a core network dedicated to the E-UTRAN.

With some exceptions, the evolved node B (eNB) 120, the node B (NB), and the base transceiver station (BTS) may be generally comprised of one or more cells. Here, the cell may refer to a cell in a typical cellular system, and the evolved node B (eNB) 120, the node B (NB) and the base transceiver station (BTS) may be devices for managing and controlling the cell. In the present specification, the evolved node B (eNB) 120, the node B (NB), and the base transceiver station (BTS) may be used as the same meaning for the convenience of explanation. In addition, in the description of the embodiments, the cells, the evolved node B (eNB) 120, the node B (NB), and the base transceiver station (BTS) may be interchangeably used with each other.

The evolved node B (eNB) 120 may be connected to a mobility management entity (MME) 150, which is one element of an evolved packet core (EPC) 160, through an S1-C interface 128. At this time, one or more mobility management entities 150a and 150b may be connected. Likewise, the radio network subsystem (RNS) 130 and the base station subsystem (BSS) 140 may be connected with a serving general packet radio service (GPRS) support node (SGSN) 170 through an Iu interface 173 and a Gb interface 175, respectively. The mobility management entity (MME) 150 and the serving general packet radio service support node (SGSN) 170 are elements for controlling the radio access network (RAN), and may perform the overall control, such as the mobility management, authentication, and security. In addition, they perform the calling and location management of the terminal in the idle mode.

Simply, it is typical that a single mobility management entity (MME) 150 manages a plurality of evolved nodes B (eNB) 120. However, the number of evolved nodes B (eNB) 120 that can be managed by a single mobility management entity (MME) 150 is limited, and the continuity of the service may be affected by the change of the mobility management entity (MME) 150. Therefore, the model in which a plurality of mobility management entities (MME) 150 manage a plurality of evolved nodes B (eNB) 120 has been introduced in order to provide services while securing smooth interworking over the wider coverage. In general, the number of mobility management entities (MMEs) 150 is much less than the number of evolved nodes B (eNB) 120. A group of a plurality of mobility management entities (MMEs) 150 is referred to as a mobility management entity (MME) pool.

The mobility management entities (MMEs) in the mobility management entity (MME) pool may be connected by an S10 interface 153. The mobility management entities (MMEs) in another mobility management entity (MME) pool may be connected by the S10 interface 153. The mobility management entities (MMEs) may transmit and receive necessary information through the S10 interface 153.

Although it is not shown in FIG. 1, the mobility management entity (MME) 150 and the serving general packet radio service support node (SGSN) 170 may be connected with each other. The terminal 100 may freely enter other radio access networks (RANs). For example, the terminal 100, which uses services in the UTRAN 135, may use services in the E-UTRAN 125. In this case, the mobility management entity (MME) 150 may make a request to the serving general packet radio service support node (SGSN) 170 for the necessary information, and the request may be transmitted through a connection between the mobility management entity (MME) 150 and the serving general packet radio service support node (SGSN) 170.

Furthermore, the mobility management entity (MME) 150 is connected with a home subscriber server (HSS) 155 through an S6a interface 158. The home subscriber server (HSS) 155 is a database server that has the overall information about the subscriber and user of the terminal 100. The mobility management entity (MME) 150 may make a request to the home subscriber server (HSS) 155 for necessary information and may receive the same. The necessary information may contain the mobility management, the call and session setup, the user authentication, or the access authorization.

In the wireless communication system, a small number of home subscriber servers (HSS) 155 are constructed. Therefore, the mobility management entity (MME) 150 frequently sends messages to the home subscriber server (HSS) 155 so that home subscriber server (HSS) 155 becomes overloaded and the performance of the entire wireless communication system may be degraded. Therefore, the authentication method of the system is required to be improved in order to solve the home subscriber server (HSS) overload problem and in order to enhance the performance of the entire wireless communication system.

DISCLOSURE OF INVENTION

Technical Problem

The present invention relates to a method and an apparatus for obtaining the authentication information. The present invention is made to provide a method and an apparatus that prevent the frequent transmission of messages between the mobility management entity (MME) and the home subscriber server (HSS) in order to thereby avoid the overload of the home subscriber server (HSS).

Solution to Problem

In order to solve the technical problems above, the embodiment of the present invention may provide a method of collecting terminal-related information of a mobility management entity (MME), which includes: receiving a message that contains identification information on a node, which stores the context of the terminal, and additional identification information; determining whether or not the MME stores the context of the terminal; if the MME does not store the context of the terminal, making a request to a node, which is indicated by the identification information on the node or the additional identification information, for authentication information; and receiving the context of the terminal from the node that is requested for the context, wherein the node, which is requested for the context, is determined according to whether or not the type of authentication information on the node corresponds to an SGSN (serving GPRS support node).

According to an embodiment of the present invention, a mobility management entity (MME) apparatus for collecting terminal-related information may include: a transmitting/receiving unit that communicates with one or more network nodes; and an authentication controller that controls to: receive a message that contains identification information on the node, which stores the context of the terminal, and additional identification information; determine whether or not the MIME stores the context of the terminal; if the MME does not store the context of the terminal, make a request to the node, which is indicated by the identification information on the node or the additional identification information, for the context; and receive the context of the terminal from the node that is requested for the context, wherein the node, which is requested for the context, is determined according to whether or not the type of identification information on the node corresponds to an SGSN (serving GPRS support node).

In addition, according to an embodiment of the present invention, an information transmission method of a terminal may include: receiving, from a combined MME/SGSN, an indicator showing that the terminal is provided with services by the combined MME/SGSN; and if it is determined that the location registration is necessary, transmitting a location registration message that contains identification information on the node, which stores the context of the terminal, and the indicator.

In addition, according to an embodiment of the present invention, a terminal for transmitting location registration information may include: a transmitting/receiving unit that performs data communication; and a controller that controls to: receive, from a combined MME/SGSN, an indicator showing that the terminal is provided with services by the combined MME/SGSN; and if it is determined that the location registration is necessary, transmit a location registration message that contains identification information on the node, which stores the context of the terminal, and the indicator.

In addition, according to an embodiment of the present invention, a node selection method of a base station may include: receiving a location registration message that contains identification information on a node that stores the context of a terminal; determining whether or not the location registration message contains an indicator showing that the terminal is provided with services by the combined MME/SGSN; and if the location registration message contains the indicator, selecting the combined MME/SGSN corresponding to the indicator as a mobility management entity for the terminal.

In addition, according to an embodiment of the present invention, a base station for selecting a mobility management node may include: a transmitting/receiving unit that performs data communication; and a node selection controller that controls to: receive a location registration message that contains identification information of a node that stores the context of a terminal; determine whether or not the location registration message contains an indicator showing that the terminal is provided with services by a combined MME/SGSN (mobility management entity/serving GPRS support node); and if the location registration message contains the indicator, select the combined MME/SGSN corresponding to the indicator as a mobility management node for the terminal.

Advantageous Effects

In the wireless communication system according to the present invention, according to a method and an apparatus for exchanging information between the terminal, the base station (eNB), and the mobility management, and according to a non-access layer node selection method and an apparatus thereof, the frequent transmission of messages between the mobility management entity (MME) and the home subscriber server (HSS) can be prevented in order to thereby avoid the overload of the home subscriber server (HSS).

BRIEF DESCRIPTION OF THE DRAWINGS

FIG. 2 is a flowchart illustrating an operation of performing the location registration in the wireless communication system, according to the first embodiment of the present invention.

MODE FOR THE INVENTION

Figure 1:
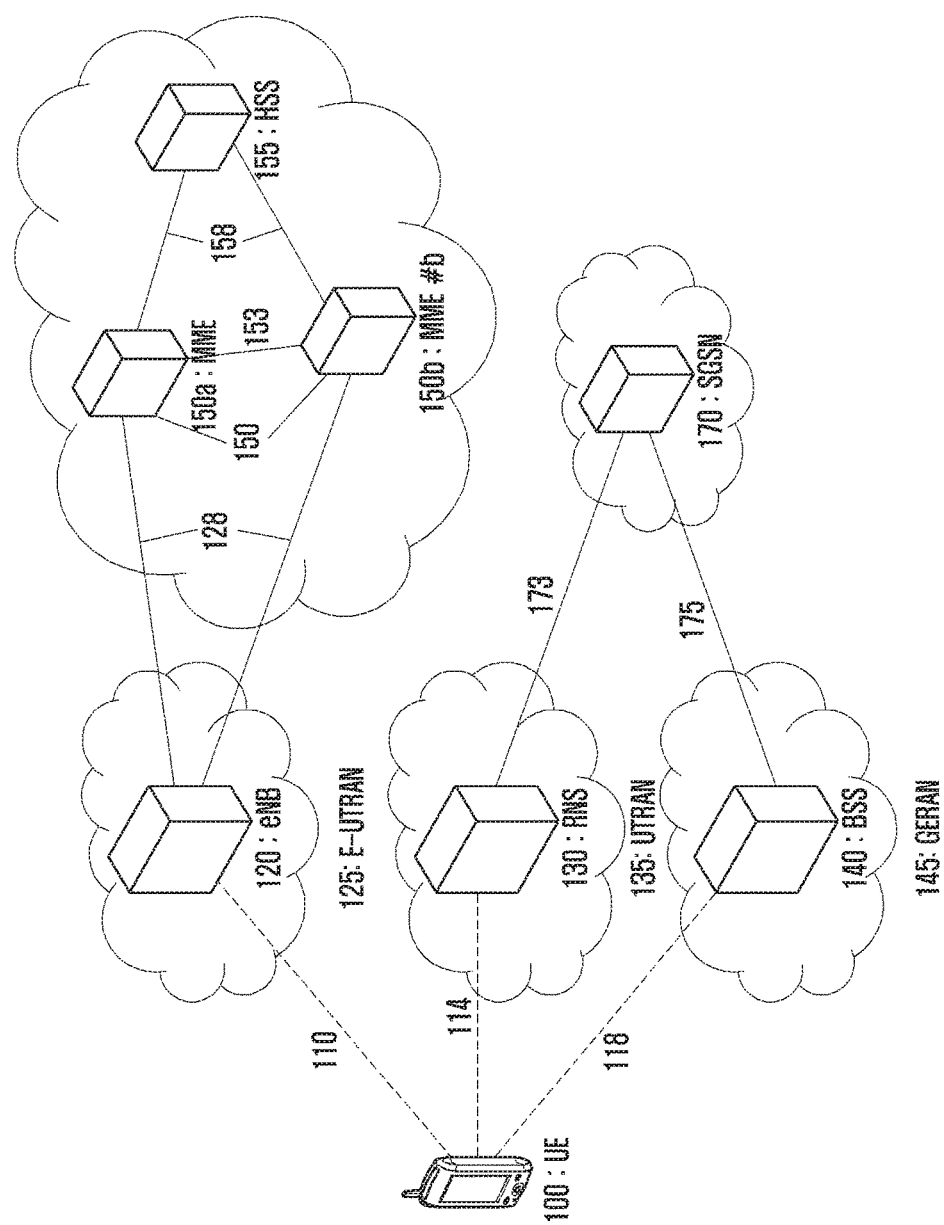
FIG. 1 illustrates a typical wireless communication system.

Hereinafter, preferred embodiments of the present invention will be described with reference to the accompanying drawings. It is noted that, where possible, the same reference numerals are designated to the same components in the accompanying drawings. Further, a detailed description of a known function and configuration which may make the subject matter of the present invention unclear will be omitted.

In addition, although the detailed description of embodiments of the present invention will be mainly made of the radio access network that is standardized by the 3GPP, the LTE that is a core network, and the evolved packet core (EPC), the subject matter of the present invention may be applied to other similar communication systems by a slight modification without departing from the scope of the present invention, and it can be determined by those skilled in the art.

In the embodiment of the present invention, the authentication information may contain authentication vectors. More specifically, the authentication vectors may include at least one of the following parameters: RAND, XRES, AUTN, or $K_{ASME}$.

FIG. 2 is a flowchart illustrating an operation of performing the location registration in the wireless communication system, according to the first embodiment of the present invention.

According to the first embodiment of the present invention, the context of the terminal 100 may be collected from the mobility management entity (MME) 150a or other nodes in order to thereby perform the location registration according to whether or not the context of the terminal 100 exists in the mobility management entity (MME) 150a.

If the terminal 100 determines that the location registration is necessary, the terminal 100 may start a location registration process (operation 200). The location registration process may include an attachment operation and a tracking area (TA) update operation. The terminal 100 may determine that the location registration is required in at least one of the cases where:

the terminal is newly turned on;

the terminal enters a new tracking area (TA) that is not contained in the managed tracking area (TA) identifier list;

a timer indicating a tracking area (TA) update period expires;

the terminal, which is in connection with the UTRAN (for example, the URA_PCH state), selects the E-UTRAN again;

the terminal, which is in connection with the GERAN, selects the E-UTRAN again;

the terminal select the E-UTRAN again while the idle mode signaling reduction (ISR) is not activated;

the radio resource control (RRC) connection is released with the release cause "Tracking area (TA) update is required for the load-rebalancing";

there is a change in the UE network capability and/or the unique discontinuous reception (DRX) parameter of the terminal 100; or the terminal 100, which supports the circuit switched fallback (CSFB) or voice calls through the Internet protocol (IP) multimedia subsystem (IMS), changes the user configuration or the voice domain preference for the E-UTRAN.

When the location registration operation is triggered, the terminal 100 may transmit a location registration message (operation 210). The terminal may send an RRC message to the evolved node B (eNB) 120. Prior to sending the RRC message, the terminal 100 and the evolved node B (eNB) 120 may perform an RRC connection establishment operation and/or other RRC connection establishment operations. The RRC message may contain at least one of:

a non-access stratum (NAS) message that is relayed by the evolved node B (eNB) 120 to the mobility management entity (MME) 150a;

an identifier of the PLMN (Public Land Mobile Network) that is selected by the terminal 100;

a globally unique MME identifier (GUMMEI) of the mobility management entity (MME) 150b that has previously provided services to the terminal 100;

information (registeredMME) in the form of a GUMMEI that is made by a combination of the information (for example, a PLMN identifier, location area (LA) codes, or a network resource identifier) of the serving general packet radio service support node (SGSN) 170 that has previously provided services to the terminal 100;

the type of GUMMEI, which shows whether or not the information in the form of a GUMMEI is obtained from the mobility management entity (MME) 150b (native), or from the serving general packet radio service support node (SGSN) 170 (mapped); or an authentication vector index (Key Set Identifier; KSI).

The NAS message may be at least one of a TRACKING AREA UPDATE REQUEST message or an ATTACH REQUEST message.

In operation 220, the evolved node B (eNB) 120 may perform the NAS node selection function (NNSF) based on the information received through operation 210.

That is, the evolved node B (eNB) may choose the mobility management entity (MME) 150a that is suitable for providing services to the terminal 100.

In operation 230, the evolved node B (eNB) 120 may relay the NAS message transmitted from the terminal 100 to the mobility management entity (MME) 150a. The NAS message may contain at least one of:

- a globally unique temporary identity (GUTI) that is allocated to the terminal 100 by the mobility management entity (MME) 150b;
- information in the form of a GUTI, which is made by using an identifier that is allocated to the terminal 100 by the serving general packet radio service support element (SGSN) 170 and other information;
- the type of GUTI, which shows whether or not the information in the form of a GUTI is obtained from the mobility management entity (MME) 150b (native), or from the serving general packet radio service support node (SGSN) 170 (mapped); or
- an additional GUTI.

The additional GUTI may be further included in the case where the GUTI is the (mapped) type that is obtained from the serving general packet radio service support node (SGSN). Therefore, only the (native) GUTI obtained from the mobility management entity (MME) may be suitable for the type of additional GUTI. That is, the GUTI that is obtained from the serving general packet radio service support node (SGSN) may not be suitable for the additional GUTI. The terminal 100 may send, as the additional GUTI, a GUTI provided by the mobility management entity (MME) that has previously provided services.

In operation 240, the mobility management entity (MME) 150a may identify whether or not the context of the terminal 100 exists in the mobility management entity (MME) 150a by using the information received through operation 230. The information in the form of a GUTI may contain the GUMMEI. The mobility management entity (MME) 150a may check the GUMMEI portion, and may determine whether or not the GUMMEI indicates the MME. As a result of the determination, if the GUMMEI indicates the MME, the context of the terminal 100 may be discovered. This case corresponds to the case where the current mobility management entity (MME) 150a is the same as the mobility management entity (MME) that has previously provided services to the terminal 100. When the GUTI is the (mapped) type obtained from the serving general packet radio service support node (SGSN), it means that the information in the form of a GUTI is not obtained from the mobility management entity (MME) 150a. Therefore, the mobility management entity (MME) 150a may not need to discover the context of the terminal 100. However, if an additional GUTI is provided, the context of the terminal 100 may be discovered by using the additional GUTI.

If the mobility management entity (MME) 150a discovers the context of the terminal 100, the mobility management entity (MME) 150a may proceed to operation 260. If the mobility management entity (MME) fails to discover the context of the terminal 100, the mobility management entity (MME) 150a may proceed to operation 250.

In operation 250, the mobility management entity (MME) 150a may collect the context of the terminal 100 from other nodes. The other nodes may refer to at least one of the mobility management entity (MME) 150b, the serving general packet radio service support node (SGSN) 170, or the home subscriber server (HSS) 155. The context may mean the general mobility management (MM) context, and may mean the general information on the terminal 100 as well. The mobility management (MM) context may contain information on the security of the terminal (e.g., EPS security context or authentication information) as well as information on the mobility management {e.g., the DRX parameter or a user equipment aggregate maximum bit rate (UE AMER)}. The context may be used to refer to all and/or some of the information contained in the mobility management (MM) context.

The mobility management entity (MME) may choose another node, to which a request for the context of the terminal is to be transmitted, by using the GUTI form information that is obtained in operation 230. It can be seen that the node may be the mobility management entity (MME) 150b or the serving general packet radio service support node (SGSN) 170 based on the type of GUTI. Operation 250-a-1 and operation 250-a-2 show a signal flow of making a request to the mobility management entity (MME) 150b for the transmission of the context of the terminal 100, and operation 250-b-1 and operation 250-b-2 show a signal flow of making a request to the serving general packet radio service support node (SGSN) 170 for the transmission of the context of the terminal 100.

In the case where the node is the serving general packet radio service support node (SGSN) 170, that is, when a serving general packet radio service support node (SGSN) 170 is requested to transmit the context of the terminal 100, the mobility management entity (MME) 150a and the serving general packet radio service support node (SGSN) 170 are based on different radio access technologies (RATs) from each other. Therefore, some of the information that is received from the serving general packet radio service support node (SGSN) 170 may not be suitable for the mobility management entity (MME) 150a. An example of the information that is not suitable for the mobility management entity (MME) 150a is authentication information. Thus, in this case, a request for the authentication information may be transmitted to the home subscriber server (HSS) 155 through operation 250-c-1 and operation 250-c-2.

In operation 260, the remaining steps of the location registration are performed by using the context of the terminal 100, and then the location registration process terminates (operation 270). The remaining steps may include an authentication operation between the mobility management entity (MME) 150a and the terminal 100, and a security mode control operation.

With the construction of the E-UTRAN, various services may be provided to the terminal 100 by the interworking of the existing UTRAN and/or GERAN. Although the E-UTRAN supports the high-speed data transmission, since the data is transmitted in a packet, it may not be suitable for the real-time transmission of data unless it interworks with the IMS network. As a representative example, voice data should be transmitted in real time during the phone-call. If the voice data is not transmitted in real time during the tele-conversation, it may be inconvenient for the users. Thus, prior to establishing the interworking with the IMS network, the network service providers use the circuit switched fallback (CSFB) technology in which the E-UTRAN is used for the general data transmission and in which the UTRAN is used for the real-time data transmission.

According to the circuit switched fallback (CSFB) technology, for example, the terminal 100, which was using services in the E-UTRAN before the phone-call, uses services in the UTRAN during the phone-call, and the terminal 100 returns to the E-UTRAN after the phone-call. When returning to the E-UTRAN, the terminal may perform the location registration process according to the first embodiment {refer to the description of the first embodiment, which states that when the terminal 100, which is in connection with the UTRAN (e.g., the URA_PCH state), selects the E-UTRAN again, the terminal may determine that the location registration is necessary}.

According to the first embodiment, when the terminal comes back from the UTRAN to the E-UTRAN and performs the location registration process, the mobility management entity (MME) 150a may receive the type of GUTI, which is indicated to be obtained from the serving general packet radio service support node (SGSN) (mapped). Furthermore, the mobility management entity (MME) 150a may make a request to the serving general packet radio service support node (SGSN) 170 for the context of the terminal 100, and may make a request to the home subscriber server (HSS) 155 for the authentication information.

Before the interworking with the IMS network is stably established, the provider may mainly use the circuit switched fallback (CSFB) in order to support phone-calls, and the phone-call is an important and widely used service among wireless communication services. Thus, the circuit switched fallback (CSFB) technology may be frequently used. In this case, the mobility management entity (MME) 150a may make a request to the home subscriber server (HSS) 155 for the authentication information very frequently, so the home subscriber server (HSS) 155 may be overloaded with the processing of the requests received from a number of mobility management entities (MMEs), which are connected thereto.

Figure 3:
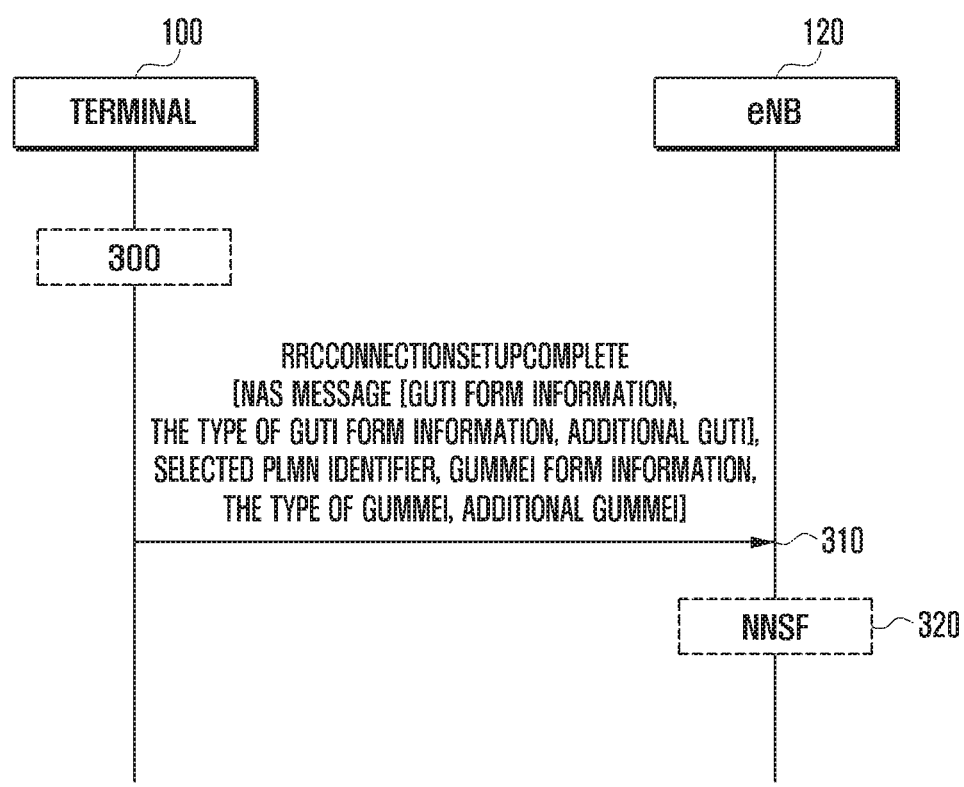
FIG. 3 is a flowchart illustrating an operation of performing the location registration in the wireless communication system, according to the second embodiment of the present invention.

FIG. 3 is a flowchart illustrating an operation of performing the location registration in the wireless communication system, according to the second embodiment of the present invention.

According to the second embodiment, the terminal 100 may properly adjust the information that is transmitted to the evolved node B (eNB) 120 so that the evolved node B (eNB) 120 may choose a mobility management entity (MME) 150a that may have the context of the terminal 100.

In operation 300, if it is determined that the location registration is necessary, the terminal 100 may trigger the location registration operation. Operation 300 may be the same or similar as operation 200 described in the first embodiment.

When the location registration operation is triggered, the terminal 100 may transmit a location registration message (operation 310). The terminal may transmit a radio resource control (RRC) message to the evolved node B (eNB) 120. Prior to sending the RRC message, the terminal 100 and the evolved node B (eNB) 120 may perform an RRC connection establishment operation and/or other RRC connection establishment operations. The RRC message may contain at least one of:
 a NAS message that is relayed by the eNB 120 to the MME 150a;
 an identifier of the PLMN (Public Land Mobile Network) that is selected by the terminal 100;
 a globally unique MME identifier (GUMMEI) of the MME that has previously provided services to the terminal 100;
 information in the form of a GUMMEI made by a combination of the information (for example, a PLMN identifier, location area (LA) codes, or a network resource identifier) of the SGSN 170 that has previously provided services to the terminal 100;
 the type of GUMMEI, which shows whether or not the information in the form of a GUMMEI is obtained from the MME (native) or from SGSN 170 (mapped); or
 an additional GUMMEI.

The NAS message may be at least one of a TRACKING AREA UPDATE REQUEST message or an ATTACH REQUEST message. The additional GUMMEI may be information that can be obtained from the additional GUTI, which may be contained in the NAS message.

In the next operation (operation 320), the evolved node B (eNB) 120 may perform the NAS node selection function (NNSF) based on the information that is received through operation 310. At this time, in order for the evolved node B (eNB) 120 to choose the mobility management entity (MME) 150a that may have the context of the terminal 100, and in order for the mobility management entity (MME) 150a to not make a request to other nodes (e.g., the MME, the SGSN and/or the HSS) for the context of the terminal 100, it is important that the terminal 100 transmits appropriate information in operation 310. That is, the terminal 100 may need to transmit, to the evolved node B (eNB) 120, the GUMMEI of the mobility management entity (MME) 150a that may have the context of the terminal 100.

The GUMMEI of the mobility management entity (MME) 150a, which may have the context of the terminal 100, may be contained in either of:
 the GUMMEI form information (registeredMME); or
 the additional GUMMEI (additionalGUMMEI).

First, the description will be made of the case where the terminal 100 includes the GUMMEI of the mobility management entity (MME) 150a, which may have the context of the terminal 100, in the GUMMEI form information. When the terminal has previously used services of the mobility management entity (MME), or when the idle mode signaling reduction (ISR) is activated, in general, the terminal 100 may transmit the GUMMEI that is obtained from the mobility management entity (MME) (the native GUMMEI). In the case where a temporary identity to be used in the next update (TIN) of the terminal 100 indicates a P-TMSI, if the terminal 100 has a valid GUTI, the terminal 100 may include the GUMMEI that is extracted from the valid GUTI in registeredMME and may transmit the same to the evolved node B (eNB) 120 in operation 310. At this time, the GUMMEI may be the (native) type that is obtained from the mobility management entity (MME). The case where the temporary identity to be used in the next update (TIN) of the terminal 100 indicates the P-TMSI may refer to the case where the serving general packet radio service support node (SGSN) has previously provided services to the terminal 100, and the case where the idle mode signaling reduction (ISR) is not activated.

In general, in the conventional system, if the temporary identity to be used in the next update (TIN) of the terminal 100 indicates the P-TMSI, the terminal transmitted the mapped GUMMEI. In this case, the mobility management entity (MME) 150a is selected as one mobility management entity (MME) from among the mobility management entity (MME) pool, and even though the context of the terminal 100 is received from the serving general packet radio service support node (SGSN) 170, which is identified by the mapped GUMMEI, since the authentication information is not suitable for the E-UTRAN, it may be required to make a request to the home subscriber server (HSS) 155 for the authentication information. However, when the native GUMMEI is transmitted to the evolved node B (eNB) 120 as described above, the evolved node B (eNB) 120 may perform the NAS node selection function (NNSF) by using the received native GUMMEI in operation 320 in order to thereby increase the probability of choosing the mobility management entity (MME) 150*a* that may have the context of the terminal 100.

Next, the operation in which the terminal 100 includes the GUMMEI of the mobility management entity (MME) 150*a*, which may have the context of the terminal 100, in the additional GUMMEI to then be transmitted to the evolved node B (eNB) 120 will be described.

In the case where the temporary identity to be used in the next update (TIN) of the terminal 100 indicates the P-TMSI:
  the mapped GUMMEI may be contained in registeredMME; and/or
  when the terminal 100 has a valid GUTI, the NAS of the terminal 100 may additionally transmit the GUMMEI that is extracted from the valid GUTI through the RRC layer. In the RRC layer, the GUMMEI extracted from the valid GUTI may be contained in the IE (e.g., the additional GUMMEI) in a proper name to then be transmitted.

When transmitting the additional GUMMEI, the type of additional GUMMEI may be transmitted together. At this time, the type of additional GUMMEI may be native. The additional GUMMEI and/or the type of additional GUMMEI may be contained in the RRCConnectionSetupComplete message, and then may be transmitted from the terminal 100 to the evolved node B (eNB) 120.

Finally, the evolved node B (eNB) 120 may receive the additional GUMMEI as well as the selected PLMN identifier, the GUMMEI form information, and the type of GUMMEI through operation 310. In operation 320, the evolved node B (eNB) 120 may perform the NAS node selection function (NNSF) by using at least one of the selected PLMN identifier, the GUMMEI form information, the type of GUMMEI, or the additional GUMMEI.

Figure 4:
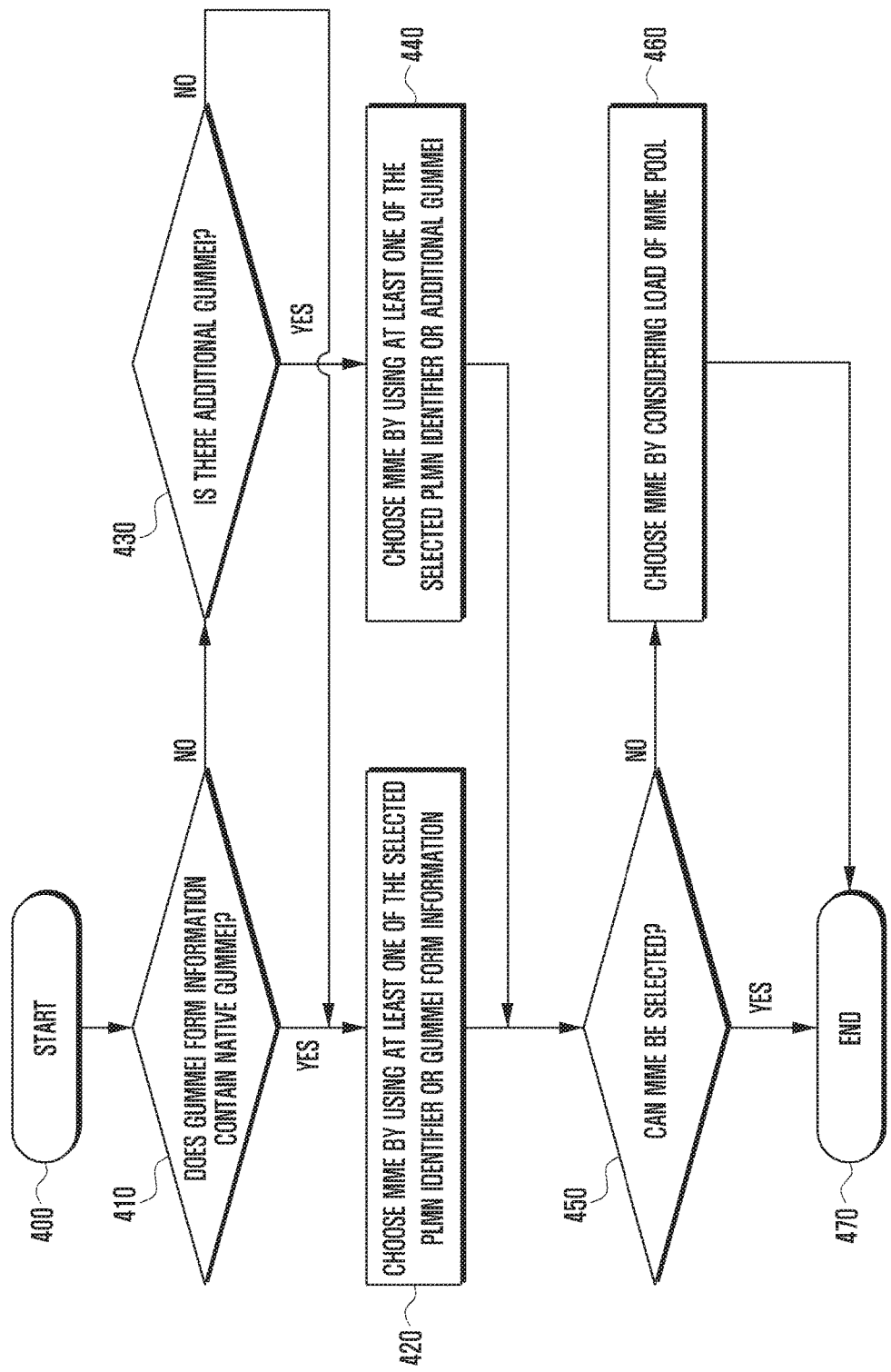
FIG. 4 is a flowchart illustrating an example of an operation of performing a NAS node selection function (NNSF) by using at least one of a GUMMEI, a selected PLMN identifier, GUMMEI form information, or the type of GUMMEI.

FIG. 4 is a flowchart illustrating an example of an operation of performing the NAS node selection function (NNSF) by using at least one of the GUMMEI, the selected PLMN identifier, the GUMMEI form information, or the type of GUMMEI.

In operation 410, the evolved node B may check whether or not the native GUMMEI is contained in the GUMMEI form information. If the native GUMMEI is contained in the GUMMEI form information as a result of the checking, the evolved node B may proceed to operation 420. Otherwise, the evolved node B may proceed to operation 430.

In operation 420, the evolved node B (eNB) 120 may choose the mobility management entity (MME) 150*a* by using at least one of the selected PLMN identifier or the GUMMEI form information. Next, the evolved node B may proceed to operation 450 in order to thereby determine whether or not to select the mobility management entity (MME). When the mobility management entity (MME) is selected, the evolved node B (eNB) may perform the remaining registration operations by using the selected mobility management entity (MME). If the evolved node B cannot choose the mobility management entity (MME), the evolved node B may proceed to operation 460 in order to thereby choose the MME in consideration of the load on the mobility management entity (MME) pool.

In operation 430, the evolved node B (eNB) 120 may identify whether or not there is an additional GUMMEI. If there is no additional GUMMEI, the evolved node B (eNB) 120 may proceed to operation 420 in order to thereby choose the MME 150*a* by using at least one of the selected PLMN identifier or the GUMMEI form information. At this time, the GUMMEI form information may contain the mapped GUMMEI. Then, the evolved node B may proceed to operation 450. If there is the additional GUMMEI, the evolved node B may proceed to operation 440

In operation 440, the evolved node B (eNB) 120 may choose the mobility management entity (MME) 150*a* by using at least one of the selected PLMN identifier or the additional GUMMEI. The evolved node B may proceed to operation 450.

In operation 450, the evolved node B may determine whether or not the mobility management entity (MME) 150*a* can be selected by using the GUMMEI. If the mobility management entity (MME) 150*a* can be selected by using the GUMMEI, the evolved node B may proceed to operation 470 in order to thereby complete the mobility management entity (MME) selection process. If the mobility management entity (MME) cannot be selected by using the GUMMEI, the evolved node B may proceed to operation 460.

In operation 460, the evolved node B (eNB) 120 may select a proper mobility management entity (MME) by considering the load on the mobility management entity (MME) pool. Next, the evolved node B may proceed to operation 470 in order to thereby complete the mobility management entity (MME) selection process.

In the MME selection process, information that is configured in the eNB may be additionally considered. The configured information may be combined MME/SGSN-related information.

Referring back to FIG. 3, the location registration process following operation 320 may be performed in a similar manner as the operations following operation 220 of the first embodiment.

The summary of the second embodiment is as follows: "in the case where the temporary identity to be used in the next update (TIN) of the terminal 100 indicates the P-TMSI, if there is a valid GUTI, the GUMMEI is extracted from the valid GUTI and is transmitted to the evolved node B (eNB) 120 to then be used to choose the MME instead of, or prior to, the mapped GUMMEI." As described above, the NAS node selection function (NNSF), according to the second embodiment, has significance in that the valid GUTI is actively utilized. However, the NAS node selection function (NNSF) is unfavorable in that there is no chance to choose the combined MME/SGSN made by both the serving general packet radio service support node (SGSN) and the mobility management entity (MME). That is, the mapped GUMMEI is suitable for the combined MME/SGSN rather than the valid GUTI because it can help in reducing the number of message exchanges for collecting the context of the terminal 100 in the evolved packet core (EPC).

Figure 5:
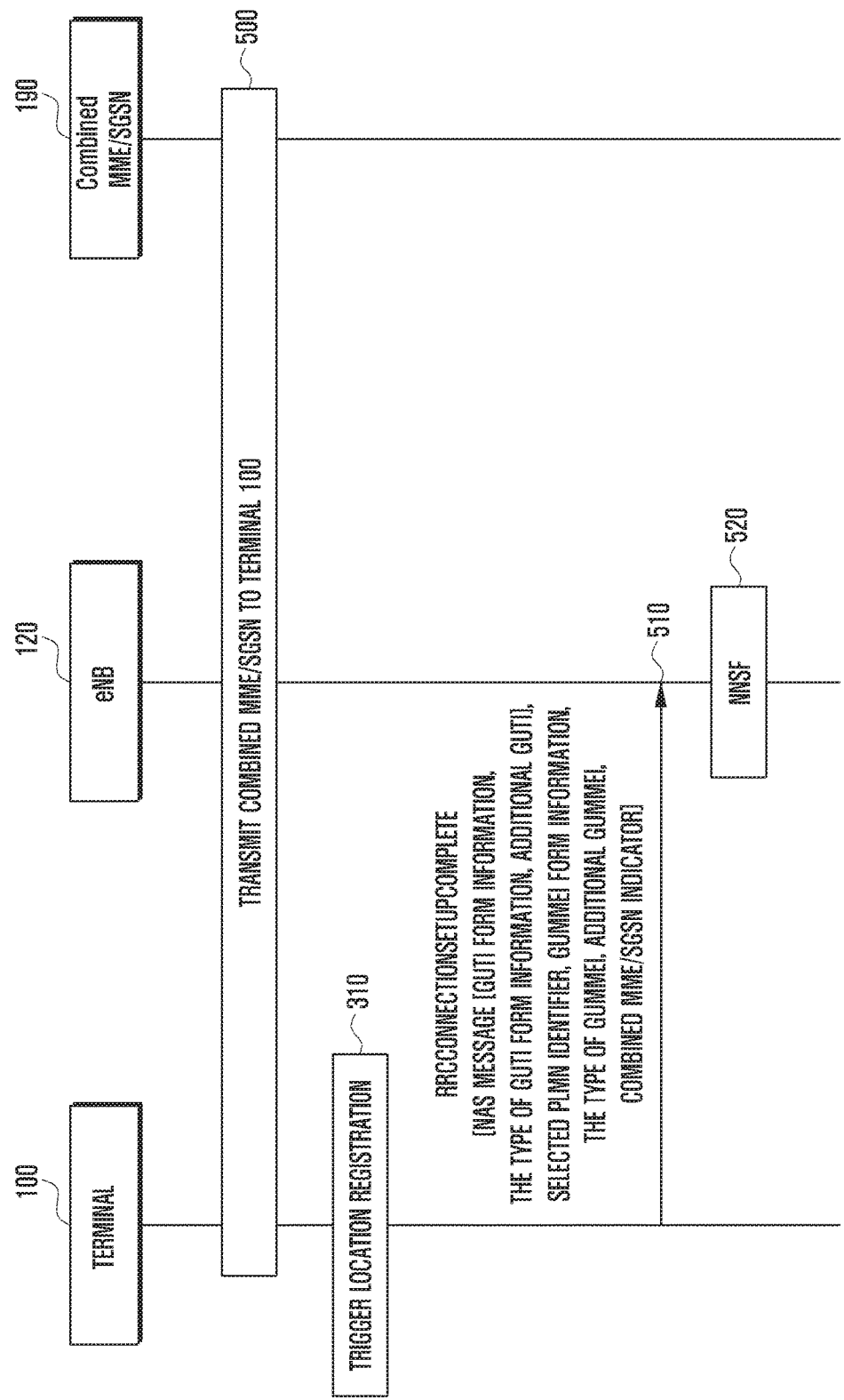
FIG. 5 is a flowchart illustrating an operation of performing the location registration in the wireless communication system, according to the third embodiment of the present invention.

FIG. 5 is a flowchart illustrating an operation of performing the location registration in the wireless communication system, according to the third embodiment of the present invention.

According to the third embodiment, in the operation of the device having a combination of the mobility management entity and the serving general packet radio service support node (the combined MME/SGSN), the NAS node selection function (NNSF) may be performed, if possible, by using the mapped GUMMEI preferentially rather than the GUMMEI extracted from the valid GUTI. The combined MME/SGSN may support both the operation of the MME and the operation of the SGSN.

In the case of using the combined MME/SGSN 190, an indicator of the combined MME/SGSN may be transmitted to the terminal 100 in operation 500. The terminal 100 may receive the combined MME/SGSN indicator and may store the same for use in the next operation. The indicator may show that the terminal 100 is being provided with services by the combined MME/SGSN 190. The indicator may be transmitted through the NAS message (for example, location registration acceptance messages, such as Attach Accept, Tracking Area Update Accept, Routing Area Update Accept, or the like). The indicator may be transferred to the base station (eNB) 120 by the S1 message, and then may be transmitted to the terminal 100 again. If the terminal 100 does not receive the combined MME/SGSN indicator through another location registration acceptance message, the terminal may delete the indicator that has been stored. Furthermore, a combined MME/SGSN indicator-related field may be provided in the storage space of the terminal 100, and if the indicator is received, the field may be configured as on, and if the indicator is not received, the field may be configured as off. Various management methods related to the indicator may be provided in the terminal 100.

In operation 510, if the terminal 100 determines that the location registration is necessary, the terminal may trigger the location registration process. This operation is the same as, or similar to, operation 200 described in the first embodiment.

When the location registration process is triggered, the terminal 100 may transmit a location registration message (operation 510). The terminal may send an RRC message to the evolved node B (eNB) 120. Prior to sending the RRC message, the terminal 100 and the evolved node B (eNB) 120 may perform an RRC connection establishment operation and/or other RRC connection establishment operations. The RRC message may contain at least one of:

a NAS message that is relayed by the eNB 120 to the MME 150a;

an identifier of the PLMN that is selected by the terminal 100;

a GUMMEI of the MME 150b that has previously provided services to the terminal 100;

information in the form of a GUMMEI made by a combination of the information (for example, a PLMN identifier, location area (LA) codes, or a network resource identifier) of the SGSN 170 that has previously provided services to the terminal 100;

the type of GUMMEI, which shows whether or not the GUMMEI form information is obtained from the MME 150b (native), or from the SGSN 170 (mapped);

an additional GUMMEI (additionalGUMMEI); or a combined MME/SGSN indicator.

The NAS message may be at least one of a TRACKING AREA UPDATE REQUEST message or an ATTACH REQUEST message. The additional GUMMEI may be information that can be obtained from the additional GUTI, which may be contained in the NAS message.

In operation 510, the terminal 100 may extract the MME identifier portion from the information in the form of a GUTI, and may fill in the field of registeredMME. At this time, available GUTI form information is shown in Table 1 below.

TABLE 1

|  | TIN Value: P-TMSI | TIN Value: GUTI | TIN Value: RAT-related TMSI |
|---|---|---|---|
| There is combined MME/SGSN | mapped GUTI obtained from P-TMSI/RAI | (Valid/native) GUTI | (Valid/native) GUTI |
| There is no combined MME/SGSN | (Valid/native) GUTI | (Valid/native) GUTI | (Valid/native) GUTI |

The table shows the MME identifier portions that are extracted from the GUTI form information for six cases, and by which the registeredMME field of the message, which is transmitted in operation 510, may be filled in. For example, in the case where a temporary identity to be used in the next update (TIN) indicates the P-TMSI, if the terminal 100 stores the combined MME/SGSN indicator, the MME identifier portion is extracted from the mapped GUTI that is obtained from the P-TMSI/RAI in order to thereby fill in the registerdMME field. As another example, in the case where a temporary identity to be used in the next update (TIN) indicates the P-TMSI, if the terminal 100 does not store the combined MME/SGSN indicator, the MME identifier portion is extracted from the valid GUTI of the terminal 100 in order to thereby fill in the registerdMME field. Some of the six cases in the table above may not follow the table.

In operation 510, the terminal 100 may include the additional GUMMEI in the registeredGUMMEI field, as well as the GUMMEI. At this time, the terminal 100 may deliver the combined MME/SGSN indicator. In the case where a temporary identity to be used in the next update (TIN) of the terminal 100 indicates the P-TMSI, the GUMMEI, which is obtained from the P-TMSI/RAI, may be contained in the registeredGUMMEI. In addition, the GUMMEI, which is extracted from the valid GUTI, may be used as the additional GUMMEI.

In operation 520, the evolved node B (eNB) 120 may perform the NAS node selection function (NSNF) by using at least one piece of the information received in operation 510. The evolved node B (eNB) may derive the mobility management entity (MME) by using at least one of the GUMMEI form information or the additional GUMMEI. In the case where there is only the GUMMEI form information because the additional GUMMEI has not been delivered, the evolved node B (eNB) 120 may derive the mobility management entity (MME) from the received GUMMEI form information. When both the GUMMEI form information and the additional GUMMEI have been delivered, the combined MME/SGSN indicator may be used to determine whether the mobility management entity (MME) is to be derived by using the GUMMEI form information or by using the additional GUMMEI. In this case (when both the GUMMEI form information and the additional GUMMEI have been delivered), the evolved node B (eNB) 120 may determine, by using the configured information, whether the mobility management entity (MME) is to be derived by using the GUMMEI form information or by using the additional GUMMEI. For example, if the information configured in the evolved node B (eNB) states "the GUMMEI form information indicates the combined MME/SGSN," the evolved node B (eNB) may derive the mobility management entity (MME) by using the GUMMEI form information.

In the case where the evolved node B (eNB) 120 is a home eNB (HeNB), an evolved home eNB (HeNB) gateway (GW) may be positioned between the mobility management entity (MME) and the evolved node B (eNB) 120. In this case, the evolved node B (eNB) 120 may take the evolved home node B gateway (HeNB GW) for the mobility management entity (MME), and the mobility management entity (MME) 150 may take the evolved home node B gateway (HeNB GW) for the evolved node B (eNB). The S1 message may be used for a message that is transmitted between the evolved node B (eNB) 120 and the evolved home node B gateway (HeNB GW), and between the evolved home node B gateway (HeNB GW) and the mobility management entity (MME) 150. Meanwhile, when the evolved home node B gateway (HeNB GW) is established, the NAS node selection function (NNSF) may be performed by the evolved home node B gateway (HeNB GW) instead of the evolved node B (eNB) 120. Therefore, the evolved node B (eNB) 120 may transmit the information necessary for the NAS node selection function (NNSF) to the evolved home node B gateway (HeNB GW) through the S1 message.

The relationship between a relay node (RN) and a donor evolved node B (DeNB) may be similar to the relationship between the evolved home node B (HeNB) and the evolved home node B gateway (HeNB GW).

Figure 6:
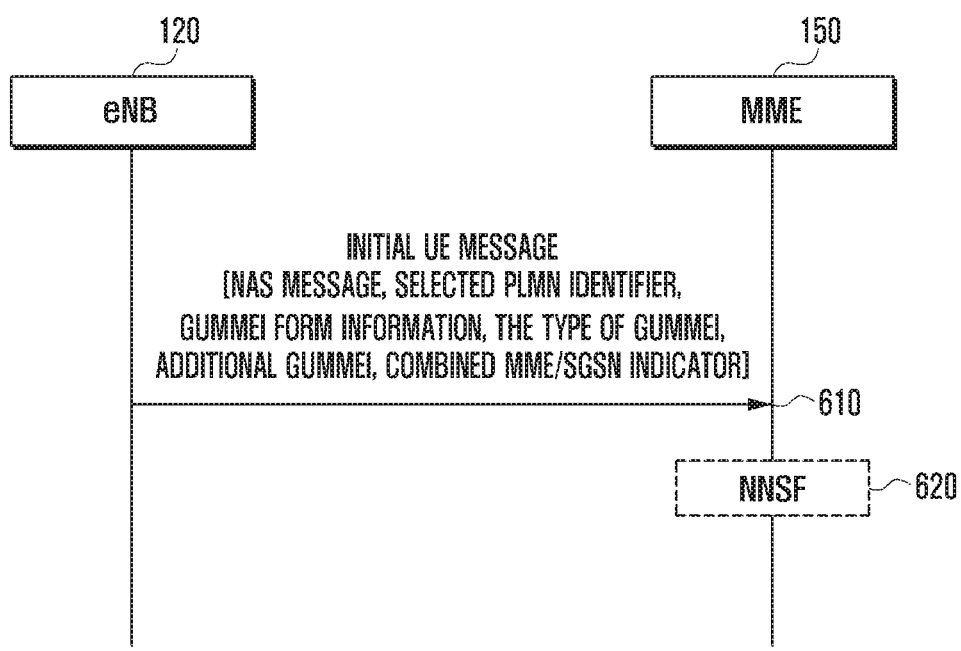
FIG. 6 is a flowchart illustrating the transmission of an S1 message, according to the fourth embodiment of the present invention.

FIG. 6 is a flowchart illustrating the transmission of the S1 message, according to the fourth embodiment of the present invention.

More specifically, in FIG. 6, the evolved node B (eNB) 120 may refer to at least one of the evolved home node B (HeNB) or the relay node (RN), and the mobility management entity (MME) 150 may refer to at least one of the evolved home node B gateway (HeNB GW) or the donor evolved node B (DeNB).

In operation 610, the evolved node B (eNB) 120 may transmit an initial UE message to the mobility management entity (MME) 150. At this time, at least one of the NAS message, the selected PLMN identifier, the GUMMEI form information, the type of GUMMEI, the additional GUMMEI, or the combined MME/SGSN indicator may be transmitted through the initial UE message. The GUMMEI form information may be registeredMME, which is received by the evolved node B (eNB) 120 from the terminal 100 through the wireless interface in at least one of the second embodiment or the third embodiment. At least one of the selected PLMN identifier or the additional GUMMEI may be the information that is received by the evolved node B (eNB) 120 from the terminal 100 through the wireless interface in at least one of the second embodiment or the third embodiment. At least one of the selected PLMN identifier, the GUMMEI form information, the type of GUMMEI, or the additional GUMMEI may be transmitted in the case where the evolved node B (eNB) 120 does not support the NAS node selection function (NNSF). The selected PLMN identifier may be contained in the TA identifier to then be delivered.

In operation 620, the mobility management entity (MME) 150 may perform the NAS node selection function (NNSF) by using at least one piece of the information that is received in operation 610. Another mobility management entity (MME) may be derived by using at least one of the selected identifier, the GUMMEI form information, or the additional GUMMEI. In the case where there is only the GUMMEI form information because the additional GUMMEI has not been delivered, the mobility management entity (MME) 150 may derive another mobility management entity (MME) from the received GUMMEI form information. In the case where both the GUMMEI form information and the additional GUMMEI are delivered, the combined MME/SGSN indicator may be used to determine whether another mobility management entity (MME) is to be derived by using the GUMMEI form information or by using the additional GUMMEI. In this case (when both the GUMMEI form information and the additional GUMMEI have been delivered), the mobility management entity (MME) 150 may determine, by using the configured information, whether another mobility management entity (MME) is to be derived by using the GUMMEI form information or by using the additional GUMMEI. For example, if the information configured in the mobility management entity (MME) 150 states "the GUMMEI form information indicates the combined MME/SGSN," another mobility management entity (MME) may be derived by using the GUMMEI form information.

The mobility management entity (MME) 150*a*, which may have the context of the terminal 100, is chosen through the second, third, and fourth embodiments above so that the number of messages that are exchanged between the evolved packet core (EPC) nodes for the collection of the context of the terminal 100 can be reduced compared to the first embodiment, and as a result, the requests transmitted to the home subscriber server (HSS) 155 may be reduced. To this end, a method for changing the terminal 100 or the evolved node B (eNB) 120 has been considered.

On the other hand, a method may be considered, in which the terminal 100 and the evolved node B (eNB) 120 are not changed compared to the first embodiment and the nodes in the evolved packet core (EPC) more actively exchange the information for the collection of the context of the terminal 100 in order to thereby reduce the requests transmitted to the home subscriber server (HSS) 155.

Hereinafter, the description will be made of the method in which the nodes in the evolved packet core (EPC) more actively exchange the information for the collection of the context of the terminal in order to thereby reduce the requests that are transmitted to the home subscriber server (HSS) with reference to FIG. 7.

Figure 7:
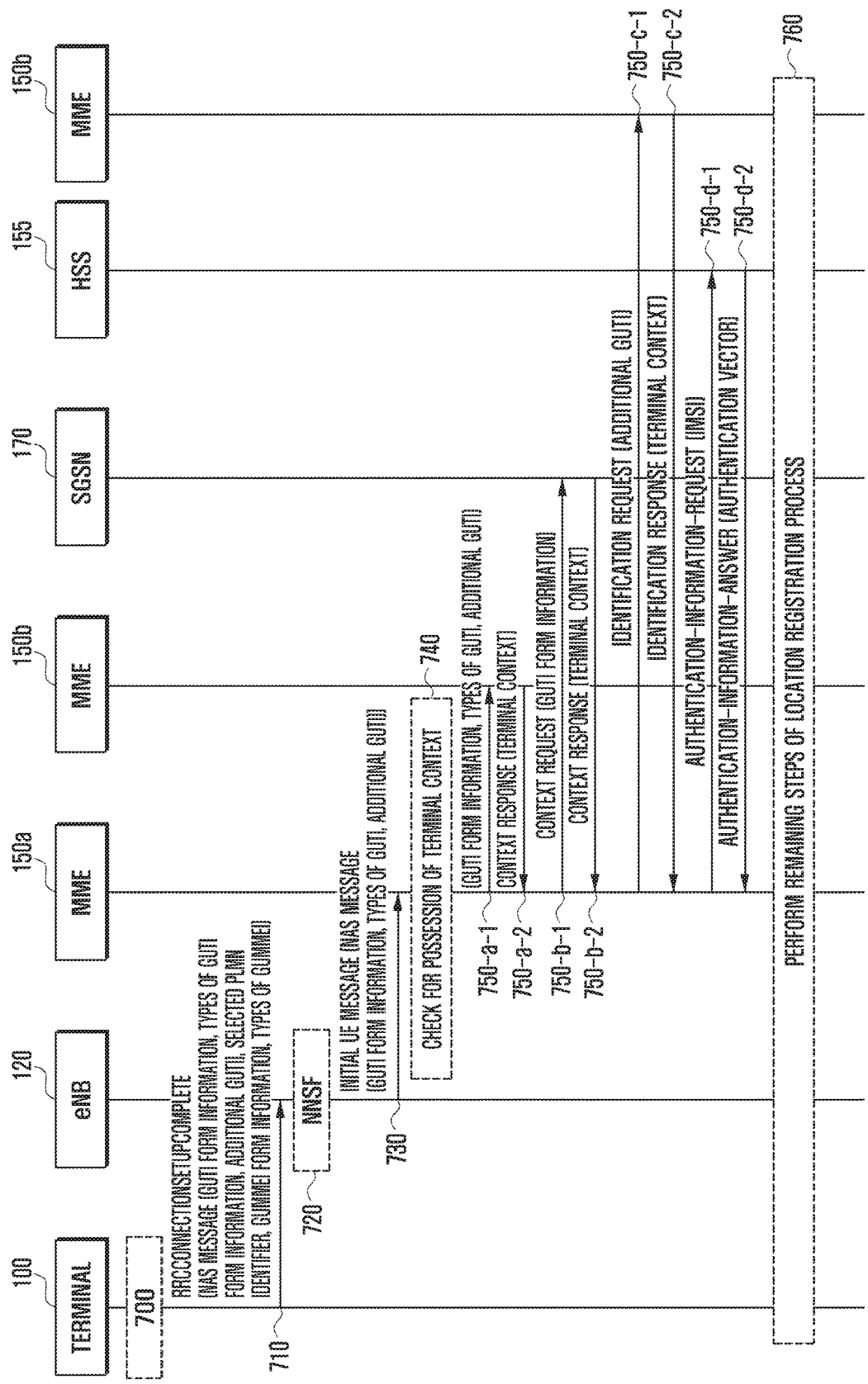
FIG. 7 is a flowchart illustrating an operation of performing the location registration in the wireless communication system, according to the fifth embodiment of the present invention.

FIG. 7 is a flowchart illustrating an operation of performing the location registration in the wireless communication system, according to the fifth embodiment of the present invention.

Operation 700 to operation 730 may follow operation 200 to operation 230 of the first embodiment.

In operation 740, the mobility management entity (MME) 150*a* may check whether or not the context of the terminal 100 exists in the mobility management entity (MME) 150*a* by using the information that is received through operation 730. The GUTI form information may contain GUMMEI. The mobility management entity (MME) 150*a* may check the GUMMEI portion, and if the GUMMEI indicates the MME, may discover the context of the terminal 100. This case corresponds to the case where the current mobility management entity (MME) 150*a* is the same as the mobility management entity (MME) that has previously provided services to the terminal 100. When the type of GUTI is obtained from the serving general packet radio service support node (SGSN) (mapped GUTI), it means that the information in the GUTI form is not obtained from the mobility management entity (MME) 150*a*. Therefore, the mobility management entity (MME) 150*a* may not need to discover the context of the terminal 100. However, if an additional GUTI is provided, the mobility management entity (MME) 150*a* may discover the context of the terminal 100 by using the additional GUTI.

If the mobility management entity (MME) 150*a* discovers the context of the terminal 100 in operation 740, the mobility management entity (MME) 150*a* may proceed to operation 760. If the mobility management entity (MME) fails to discover the context of the terminal 100 in operation 740, the mobility management entity (MME) 150*a* may proceed to operation 750.

In operation 750, the mobility management entity (MME) 150*a* may collect the context of the terminal 100 from other nodes. The other nodes may refer to at least one of the mobility management entity (MME) 150*b*, the serving general packet radio service support node (SGSN) 170, another mobility management entity (MME) 150*c*, or the home subscriber server (HSS) 155. The context may mean the general mobility management (MM) context, and may mean the general information on the terminal 100 as well. The mobility management (MM) context may contain information on the security of the terminal (e.g., EPS security context or authentication information) as well as mobility management (MM)-related information (for example, the DRX parameter or UE AMBR). The context may be used to refer to all and/or some of the information contained in the mobility management (MM) context.

Another node, to which a request for the context of the terminal 100 is to be transmitted, may be chosen by using the GUTI form information that is obtained in operation 730. It can be seen that the node may be the mobility management entity (MME) 150*b* or the serving general packet radio service support node (SGSN) 170 based on the type of GUTI. In addition, the type of service that has been provided may be estimated according to the type of GUTI. For example, if the type of GUTI is native, it may mean that the terminal 100 has been provided with LTE services, and if the type of GUTI is mapped, it may means that the terminal 100 has been provide with 3G or 2G services. If the type of GUTI is native, according to operation 750-*a*-1 and operation 750-*a*-2, a request for sending the context of the terminal 100 may be transmitted to the mobility management entity (MME) 150*b* that is indicated by the native GUTI. If the GUTI is the (mapped) type that is obtained from the serving general packet radio service support node (SGSN), according to operation 750-*b*-1 and operation 750-*b*-2, a request for sending the context of the terminal 100 may be transmitted to the serving general packet radio service support node (SGSN) 170 that is indicated by the mapped GUTI.

In the case of the mapped GUTI, an additional GUTI may be given. The mobility management entity (MME) 150*a* may make a request to the mobility management entity (MME) 150*c*, which is indicated by the additional GUTI, as well as the serving general packet radio service support node (SGSN) 170, for sending the context of the terminal 100. In operation 750-C-1, the mobility management entity (MME) 150*a* may make a request to another mobility management entity (MME) 150*c* for transmitting the context of the terminal 100 by including the additional GUTI in at least one of the identification request message or the context request message. In response thereto, the mobility management entity (MME) 150*c* may transmit the context of the terminal 100 to the mobility management entity (MME) 150*a* through at least one of the identification request message or the context request message. The mobility management entity (MME) 150*a* may choose and store only the authentication information from the context of the terminal 100 received from the mobility management entity (MME) 150*c*.

The mobility management entity (MME) 150*a* may receive the context of the terminal 100 from the SGSN 170 through operation 750-*b*, and may additionally receive the context of the terminal 100 from the mobility management entity (MME) 150*c* through operation 750-C as well. In this case, the mobility management entity (MME) may create the context of the terminal 100 by a combination of the context of the terminal 100 received from SGSN 170 and the context of the terminal 100 received from the MME 150*c*. For example, the mobility management entity (MME) may take the information except for the authentication information from the SGSN 170, and may take the authentication information from the MME 150*c*.

A new message may be used in operation 750-*c*. The message that is transmitted in operation 750-*c*-1 may contain the additional GUTI. The message that is transmitted in operation 750-*c*-2 may contain at least one of the additional GUTI or the authentication information of the terminal. In this case, the MME 150*a* may selectively receive only the information (the authentication information) necessary for the MME 150*a* without receiving all the context of the terminal 100 from the MME 150*c*.

If the MME 150*a* receives the context of the terminal 100 containing the authentication information from at least one of the other MMES 150*b* and 150*c* (operation 750-*a*-2 or operation 750-*c*-2), the authentication information may be treated as follows. The authentication information may contain at least one of five or less authentication vectors and KSIs. The KSI may be an indicator that indicates the authentication vector that has been used between the MME 150*b* or 150*c* and the terminal 100 in the previous service for the terminal 100. The mobility management entity (MME) 150*a* may not use the authentication vector that has been previously used by the terminal 100 and the MME 150*b* or 150*c* in order to enhance the security. To this end, the KSI that is received in at least one of the operations 710, 750-*a*-2, and 750-*c*-2 may be used. The MME 150*a* may not use the authentication vector indicated by the KSI. As an example of a method for the same, the authentication for the terminal 100 may be performed by using the authentication vector that is indicated as "(KSI+1) modulo {the number of received authentication vectors}." A value of "(KSI+1) modulo {the number of received authentication vectors}" may be newly designated as the KSI in the MME 150*a*, and may be transmitted to the terminal 100.

In order for the MME 150*a* to not use the authentication vector that has been previously used by the terminal 100 and the MME 150*b* or 150*c*, in addition to the method above, the MME 150*b* or 150*c* may not transmit, to the MME 150*a*, the authentication vector that has been used by itself at all.

The message transmitted in operation 750-*c*-1 may contain a NAS message that is sent from the terminal 100 to MME 150*a*. The MME 150*c* may perform the integrity check by using the NAS message. At this time, even if the integrity check is not successful, the MME 150*c* may transmit the authentication information of the terminal 100 in operation 750-*c*-2. In this case, the MME 150*c* may send information stating that the NAS message received from the MME 150*a* has failed in the integrity check. The information stating that the NAS message received from the MME 150*a* has failed in the integrity check may be informed of by configuring the KSI to be 7, for example, and sending the same.

If there are problems that the mobility management entity (MME) 150*c* does not contain the context of the terminal 100 or the messages are not smoothly exchanged between the mobility management entity (MME) 150*c* and the mobility management entity (MME) 150*a*, a request for the authentication information may be transmitted to the HSS 155.

When valid authentication information of the terminal 100 is obtained, the MME 150a may use the authentication information for the authentication of the terminal 100 afterwards.

Figure 8:
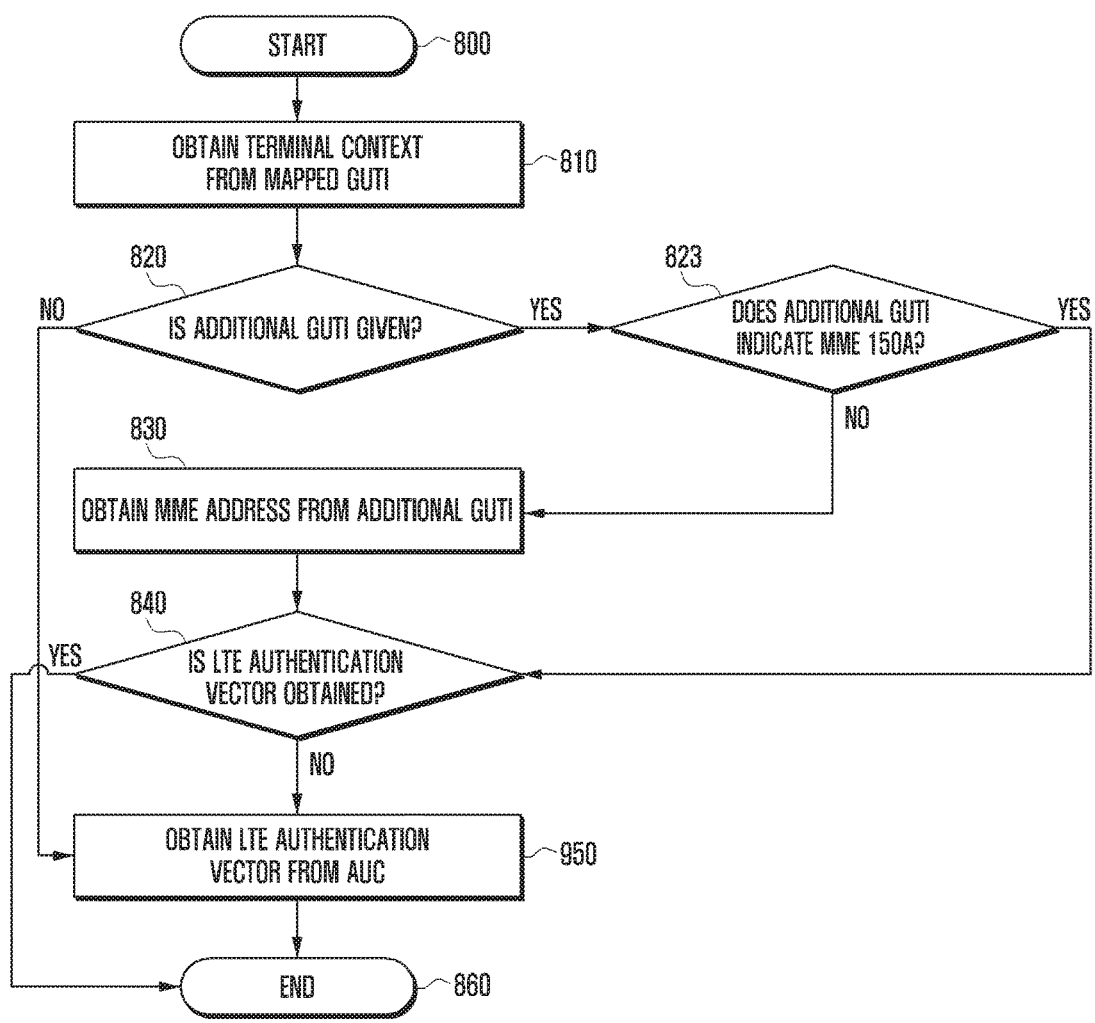
FIG. 8 is a flowchart illustrating the operation of the mobility management entity (MME) when a mapped GUTI is received.

FIG. 8 is a flowchart illustrating the operation of the mobility management entity (MME) when the mapped GUTI is received.

In operation 810, the mobility management entity (MME) may obtain the context of the terminal 100 by using the mapped GUTI. The mobility management entity (MME) may proceed to operation 820.

In operation 820, the mobility management entity (MME) may identify whether or not the additional GUTI is given. At this time, if the additional GUTI is identified to exist, the mobility management entity (MME) may proceed to operation 823. If the GUTI is not identified, the mobility management entity (MME) may proceed to operation 850.

In operation 823, the mobility management entity (MME) may identify whether or not the additional GUTI indicates the mobility management entity (MME) 150a. If the additional GUTI indicates the mobility management entity (MME) 150a, the mobility management entity (MME) may proceed to operation 840. If the additional GUTI does not indicate the mobility management entity (MME) 150a, the mobility management entity (MME) may proceed to operation 830.

In operation 830, the mobility management entity (MME) may obtain the address of the mobility management entity (MME) 150c from the additional GUTI. Next, the mobility management entity (MME) may proceed to operation 840.

In operation 840, the mobility management entity (MME) may check whether or not the LTE authentication vector is available. Prior to this operation, the mobility management entity (MME) may perform an operation of obtaining the LTE authentication vector from the appropriate mobility management entity (MME). For example, provided that the mobility management entity (MME) has performed operation 830, the mobility management entity (MME) may transmit the identification request message to the mobility management entity (MME) 150c that is identified by the GUMMEI obtained from the additional GUTI, in order to thereby obtain the LTE authentication vector. If the LTE authentication vector is obtained, the mobility management entity (MME) may proceed to operation 860 in order to thereby complete the acquisition process. If the LTE authentication vector is not obtained, the mobility management entity (MME) may proceed to operation 850 in order to thereby obtain the authentication vector from the home subscriber server (HSS) 155, and then may proceed to operation 860 in order to thereby complete the acquisition process.

In operation 860, the mobility management entity (MME) may perform the remaining operations of the location registration process by using the context of the terminal 100 to then complete the location registration. The remaining operations may include an authentication operation between the mobility management entity (MME) 150a and the terminal 100 or a security mode control operation.

According to the fifth embodiment, the mobility management entity (MME) 150a may make a request to both the serving general packet radio service support node (SGSN) 170 and the mobility management entity (MME) 150c for the context of the terminal 100. In this case, the success of obtaining the context of the terminal 100 by the mobility management entity (MME) 150a from the mobility management entity (MME) 150c depends on the elapsed time from the time when the mobility management entity (MME) 150c provided services to the terminal 100. If the mobility management entity (MME) 150c deletes the context of the terminal 100 because the elapsed time from the time when the mobility management entity (MME) 150c provided services to the terminal 100 is longer than a specific period of time, it may be useless to make a request to the mobility management entity (MME) 150c for the context of the terminal 100.

Figure 9:
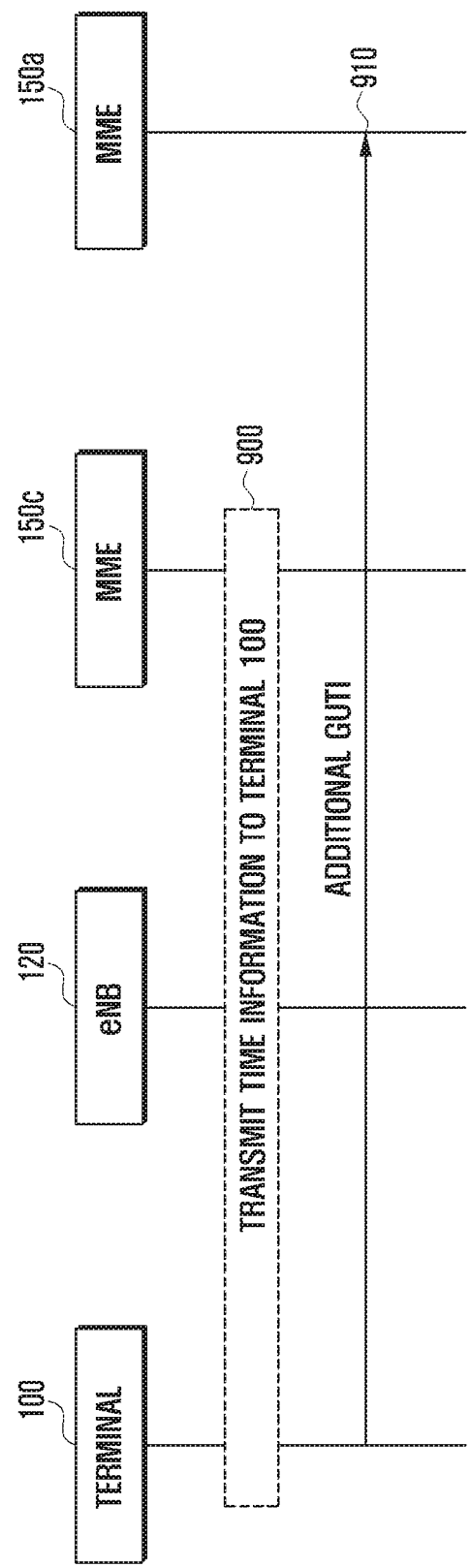
FIG. 9 is a flowchart illustrating a registration process depending on time information, according to the sixth embodiment of the present invention.

FIG. 9 is a flowchart illustrating a registration process depending on time information, according to the sixth embodiment of the present invention.

According to the sixth embodiment of the present invention, the terminal 100 may receive information that is related to the time when the mobility management entity (MME) 150c provides services. This information may be forwarded to the mobility management entity (MME) 150a, and the mobility management entity (MME) 150a may use the same when making a request to the mobility management entity (MME) 150c for the context of the terminal 100.

In operation 900, the mobility management entity (MME) 150c may transmit the time information on the mobility management entity (MME) 150c to the terminal 100. The time information may contain at least one of the time when the mobility management entity (MME) 150c provides services or the time for which mobility management entity (MME) 150c stores the context of the terminal 100.

In operation 910, the terminal 100 may transmit at least one of the TRACKING AREA UPDATE REQUEST message or the ATTACH REQUEST message. In operation 910, the terminal 100 may determine whether or not the additional GUTI is to be contained when transmitting the message based on the time information received in operation 900. If it is not necessary to inform the mobility management entity (MME) 150a of the additional GUTI because the additional GUTI was allocated from the mobility management entity (MME) 150c long ago, the additional GUTI may not be contained.

Figure 10:
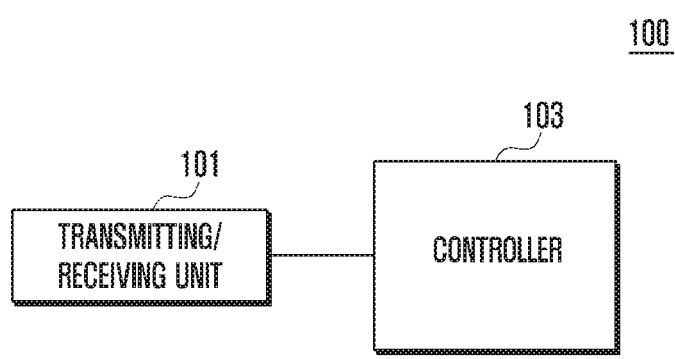
FIG. 10 is a block diagram illustrating a terminal (UE), according to an embodiment of the present invention.

FIG. 10 is a block diagram illustrating the terminal (UE), according to an embodiment of the present invention.

Referring to FIG. 10, the terminal 100 may include a transmitting/receiving unit 101 and a controller 103.

The transmitting/receiving unit 101 may perform the data communication with external devices. The controller 103 may control the overall operations of the terminal 100. In particular, in the embodiment of the present invention, the controller 103 may control to: receive, from the combined MME/SGSN, an indicator showing that the terminal is provided with services by the combined MME/SGSN; and if it is determined that the location registration is necessary, transmit a location registration message that contains the identification information of the node, which stores the context of the terminal, and the indicator.

Figure 11:
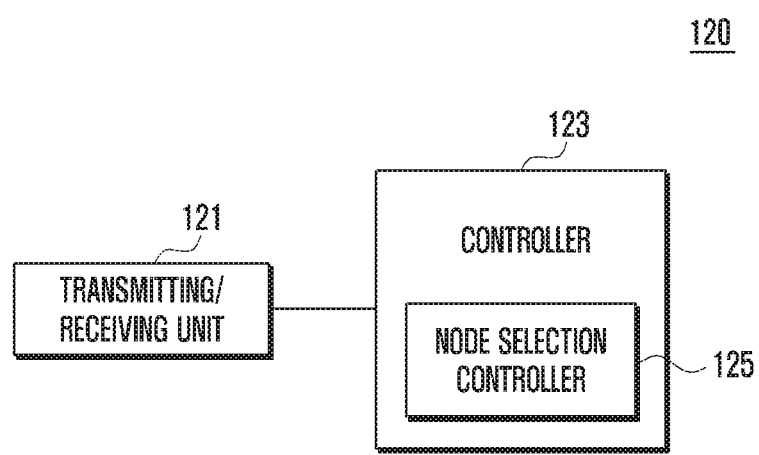
FIG. 11 is a block diagram illustrating a base station (eNB), according to an embodiment of the present invention.

FIG. 11 is a block diagram illustrating the base station (eNB), according to an embodiment of the present invention.

Referring to FIG. 11, the base station 120 may include a transmitting/receiving unit 121 and a controller 123.

The transmitting/receiving unit 121 may perform the data communication with external devices. The controller 123 may control the overall operations of the base station 120. In particular, the controller 123 may include a node selection controller 125.

The node selection controller 125 may control to: receive a location registration message that contains the identification information of the node that stores the context of the terminal; determine whether or not the location registration message contains an indicator showing that the terminal is provided with services by the combined MME/SGSN (mobility management entity/serving GPRS support node); and if the location registration message contains the indicator, select the combined MME/SGSN corresponding to the indicator as the mobility management node for the terminal.

In addition, if the location registration message does not contain the indicator, the node selection controller 125 may control to select the mobility management node for the terminal from the GUMMEI form information of the identification information.

In addition, the node selection controller 125 may control to select the mobility management node for the terminal by preferentially using the GUMMEI for the MME rather than the GUMMEI for the SGSN, which are contained in the identification information.

Although the controller 123 and the node selection controller 125 are illustrated to be separated as different blocks, this is only for the convenience of explanation and the present invention is not limited thereto.

Figure 12:
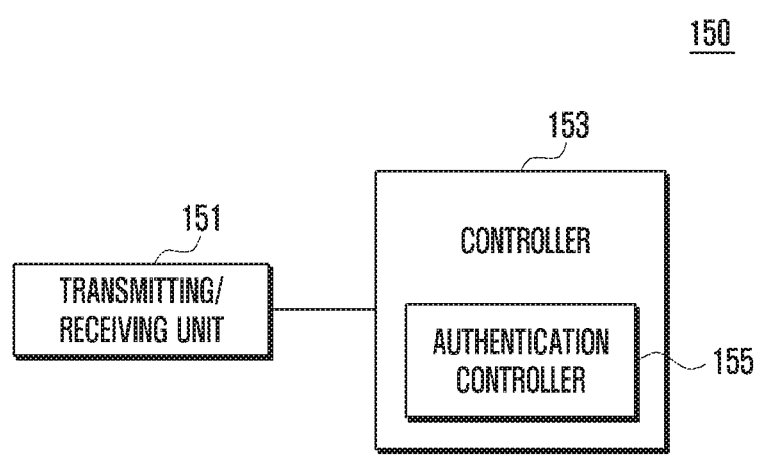
FIG. 12 is a block diagram illustrating a mobility management entity (MME) according to an embodiment of the present invention.

FIG. 12 is a block diagram illustrating the mobility management entity (MME) according to an embodiment of the present invention.

Referring to FIG. 12, the mobility management entity (MME) 150 may include a transmitting/receiving unit 151 and a controller 153.

The transmitting/receiving unit 151 may perform the data communication with external devices. The controller 153 may control the overall operations of the mobility management entity (MME). In particular, the controller 153 may further include an authentication controller 155.

The authentication controller 155 may control to: receive a message that contains the identification information on the node, which stores the context of the terminal, and the additional identification information; determine whether or not the MME stores the context of the terminal; if the MME does not store the context of the terminal, make a request to the node that is indicated by the identification information on the node or the additional identification information for the context; and receive the context of the terminal from the requested node. At this time, the node, to which the request for the context is made, may be determined according to whether or not the type of identification information on the node corresponds to the SGSN (serving GPRS support node).

If the type of identification information on the node corresponds to the SGSN, the authentication controller 155 may control to receive the context from the SGSN indicated by the identification information on the node and to receive the authentication information from the MME indicated by the additional identification information.

At this time, the identification information on the node may contain GUTI (Globally Unique Temporary Identity) information that contains GUMMEI (Globally Unique MME Identifier) information, and the additional identification information may contain additional GUTI information that contains GUMMEI information on the MME.

In addition, if the MME stores the context of the terminal, the authentication controller 155 may control to perform the location registration process by using the stored context.

In addition, if the type of identification information on the node does not correspond to the SGSN, the authentication controller 155 may control to receive the context from the node indicated by the identification information on the node.

The context may contain the authentication information, and the authentication information may contain at least one of RAND, XRES, AUTN, $K_{ASME}$, or KSI. In addition, the authentication controller 155 may control to select an authentication vector corresponding to the remainder obtained by dividing a value, which is obtained by adding a certain value to the KSI contained in the received authentication information, by the number of authentication vectors contained in the received authentication information.

Although the controller 153 and the authentication controller 155 are illustrated to be separate blocks in the embodiment above, this is only for the convenience of explanation, and the present invention is not limited thereto.

In the embodiments above, all of the operations and the messages may be selectively performed or omitted. Further, steps in each embodiment do not have to be sequentially performed and orders thereof may be changed. The message transfer may also not be sequentially performed, and a sequence of the message transfer may be changed.

Meanwhile, exemplary embodiments of the present invention shown and described in this specification and the drawings correspond to specific examples presented in order to easily explain technical contents of the present invention, and to help comprehension of the present invention, but are not intended to limit the scope of the present invention. That is, it is obvious to those skilled in the art to which the present invention belongs that different modifications can be achieved based on the technical spirit of the present invention.

The invention claimed is:

1. A method of collecting terminal-related information of a first mobility management entity (MME), the method comprising:
   receiving, at the first MME, a message that includes identification information on a node that stores the context of a terminal and additional identification information;
   determining whether or not the first MME stores the context of the terminal;
   if the first MME does not store the context of the terminal, determining whether or not a type of the identification information on the node corresponds to a serving GPRS support node (SGSN); and
   if the type of the identification information on the node corresponds to the SGSN:
      receiving, at the first MME, the context of the terminal from the first SGSN,
      receiving authentication information of the terminal from a second MME corresponding to the additional identification information, and
      combining the context and the authentication information of the terminal.

2. The method of claim 1, further comprising, performing a location registration process by using the stored context if the first MME stores the context of the terminal.

3. The method of claim 1, wherein the identification information on the node includes Globally Unique Temporary Identity (GUTI) information that includes Globally Unique MME Identifier (GUMMEI) information, and the additional identification information includes additional GUTI information that includes GUMMEI information on the first MME.

4. The method of claim 1, further comprising, receiving the context of the terminal from a third MME corresponding to the identification information if the type of identification information on the node does not correspond to the SGSN.

5. The method of claim 1, wherein the context includes authentication information, and the authentication information includes at least one of RAND, XRES, AUTN, KASME, or KSI.

6. The method of claim 5, further comprising performing the authentication for the terminal, wherein the performing of the authentication comprises selecting an authentication vector corresponding to the remainder obtained by dividing a value, which is obtained by adding a certain value to the KSI included in the received authentication information, by the number of authentication vectors included in the received authentication information.

7. A first mobility management entity (MME) apparatus for collecting terminal-related information, the apparatus comprising:
   a transceiver configured to communicate with one or more network nodes; and
   an authentication controller configured to:
     receive a message that includes identification information on a node, which stores the context of a terminal, and additional identification information,
     determine whether or not the first MME stores the context of the terminal;
     if the first MME does not store the context of the terminal, determine whether or not a type of the identification information on the node corresponds to a serving GPRS support node (SGSN), and
     if the type of the identification information on the node corresponds to the SGSN, receive the context of the terminal from the SGSN, receive authentication information of the terminal from a second MME corresponding to the additional identification information, and combine the context and the authentication information of the terminal.

8. The apparatus of claim 7, wherein the authentication controller is further configured to perform a location registration process by using the stored context if the first MME stores the context of the terminal.

9. The apparatus of claim 7, wherein the identification information on the node includes Globally Unique Temporary Identity (GUTI) information that includes Globally Unique MME Identifier (GUMMEI) information, and the additional identification information includes additional GUTI information that includes GUMMEI information on the first MME.

10. The apparatus of claim 7, wherein the controller is further configured to receive the context from a third MME corresponding to the identification information if the type of identification information on the node does not correspond to the SGSN.

11. The apparatus of claim 7, wherein the context includes authentication information, and the authentication information includes at least one of RAND, XRES, AUTN, KASME, or KSI.

12. The apparatus of claim 11, wherein the authentication controller is further configured to select an authentication vector corresponding to the remainder obtained by dividing a value, which is obtained by adding a certain value to the KSI included in the received authentication information, by the number of authentication vectors included in the received authentication information.

13. An information transmission method of a terminal, the method comprising:
   receiving, from a combined mobility management entity/serving GPRS support node (MME/SGSN) or a base station, an indicator indicating whether the base station to which the terminal is connected is provided with services by the combined MME/SGSN; and
   if it is determined that the location registration is necessary, transmitting a location registration message that includes identification information on a node that stores the context of the terminal and the indicator, the identification information including a valid Globally Unique Temporary Identity (GUTI) associated with the MME and a mapped Globally Unique MME Identifier (GUMMEI) associated with the SGSN,
   wherein if the base station is provided with services by the combined MMS/SGSM, the combined MME/SGSN corresponding to the indicator is selected as a MME for the terminal by the base station preferentially using the mapped GUMMEI rather than a GUMMEI extracted from the valid GUTI.

14. The method of claim 13, wherein the indicator is used for selecting a mobility management entity of the terminal by a base station that receives the location registration message.

15. A terminal for transmitting location registration information, the terminal comprising:
   a transceiver configured to perform data communication; and
   a controller configured to:
     receive, from a combined mobility management entity/serving GPRS support node (MME/SGSN) or a base station, an indicator indicating whether the base station to which the terminal is connected is provided with services by the combined MME/SGSN, and
     if it is determined that the location registration is necessary, transmit a location registration message that includes identification information on a node that stores the context of the terminal and the indicator, the identification information including a valid Globally Unique Temporary Identity (GUTI) associated with the MME and a mapped Globally Unique MME Identifier (GUMMEI) associated with the SGSN,
   wherein if the base station is provided with services by the combined MMS/SGSM, the combined MME/SGSN corresponding to the indicator is selected as a MME for the terminal by the base station preferentially using the mapped GUMMEI rather than a GUMMEI extracted from the valid GUTI.

16. The terminal of claim 15, wherein the indicator is used for selecting a mobility management entity of the terminal by the base station that receives the location registration message.

17. A node selection method of a base station, the method comprising:
   receiving a location registration message that includes identification information on a node that stores the context of a terminal;
   determining whether or not the location registration message includes an indicator indicating that the base station to which the terminal is connected is provided with services by a combined mobility management entity/serving GPRS support node (MME/SGSN); and
   if the location registration message includes the indicator, selecting the combined MME/SGSN corresponding to the indicator as a mobility management entity for the terminal by preferentially using a mapped Globally Unique MME Identifier (GUMMEI) associated with the SGSN rather than a GUMMEI extracted from a valid Globally Unique Temporary Identity (GUTI) associated with the MME,
   wherein the valid GUTI and the mapped GUMMEI are included in the identification information.

18. The method of claim 17, wherein the selecting comprises, if the location registration message does not include the indicator, selecting a mobility management node for the terminal from Globally Unique MME Identifier (GUMMEI) form information of the identification information.

19. A base station for selecting a mobility management node, the base station comprising:
- a transceiver configured to perform data communication; and
- a node selection controller configured to:
  - receive a location registration message that includes identification information of a node that stores the context of a terminal,
  - determine whether or not the location registration message includes an indicator indicating that the base station to which the terminal is connected is provided with services by a combined mobility management entity/serving GPRS support node (MME/SGSN), and
- if the location registration message includes the indicator, select the combined MME/SGSN corresponding to the indicator as a mobility management node for the terminal by preferentially using a mapped Globally Unique MME Identifier (GUMMEI) associated with the SGSN rather than a GUMMEI extracted from a valid Globally Unique Temporary Identity (GUTI) associated with the MME,
- wherein the valid GUTI and the mapped GUMMEI are included in the identification information.

20. The base station of claim 19, wherein if the location registration message does not include the indicator, the node selection controller is further configured to select the mobility management node for the terminal from a globally unique MME identifier (GUMMEI) form information of the identification information.

* * * * *